United States Patent
Onuma

(10) Patent No.: US 7,855,606 B2
(45) Date of Patent: Dec. 21, 2010

(54) OSCILLATOR DEVICE

(75) Inventor: Kazufumi Onuma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 158 days.

(21) Appl. No.: 12/372,711

(22) Filed: Feb. 17, 2009

(65) Prior Publication Data

US 2009/0212874 A1 Aug. 27, 2009

(30) Foreign Application Priority Data

Feb. 22, 2008 (JP) .............................. 2008-040752

(51) Int. Cl.
*H03L 7/00* (2006.01)
(52) U.S. Cl. ..................... 331/15; 331/109; 331/160; 331/182; 331/183
(58) Field of Classification Search ............ 331/16–18, 331/25, 34, 35, 154–164, 173, 175, 179, 331/182, 183; 73/504.12, 514.29; 310/317; 359/199.1, 238, 254, 278; 398/140, 198; 354/204
See application file for complete search history.

(56) References Cited

U.S. PATENT DOCUMENTS

| | | | | |
|---|---|---|---|---|
| 6,569,109 | B2 * | 5/2003 | Sakurai et al. ............... | 601/2 |
| 6,838,661 | B2 * | 1/2005 | Klement .................... | 250/234 |
| 7,085,030 | B2 * | 8/2006 | Sakai ...................... | 359/199.3 |
| 7,446,921 | B2 * | 11/2008 | Suzuki et al. ............ | 359/224.1 |

FOREIGN PATENT DOCUMENTS

| | | |
|---|---|---|
| JP | 4-301727 | 10/1992 |
| JP | 2005-241482 | 9/2005 |
| JP | 2005-292627 | 10/2005 |

\* cited by examiner

*Primary Examiner*—Joseph Chang
*Assistant Examiner*—Jeffrey Shin
(74) *Attorney, Agent, or Firm*—Fitzpatrick, Cella, Harper & Scinto

(57) ABSTRACT

An oscillator device having an oscillation system including an oscillator and a resilient supporting member, a driving member configured to supply a driving force to the oscillation system based on a driving signal, a detecting member configured to detect at least an oscillation amplitude of the oscillator, a driving amplitude control unit configured to control at least a driving amplitude of the driving signal, and a driving frequency control unit configured to control a driving frequency of the driving signal to be supplied to the driving member, wherein, in a state in which the driving amplitude control unit controls the driving amplitude of a driving signal so that the oscillation amplitude to be detected becomes equal to a target value, and on the basis of information including driving frequencies in different driving states being driven with driving signals of these driving frequencies as well as the controlled driving amplitude, the driving frequency control unit acquires, as a resonance frequency of the oscillation system, a driving frequency with which the driving amplitude of the driving signal becomes minimal.

16 Claims, 8 Drawing Sheets

OSCILLATOR DEVICE

FIELD OF THE INVENTION AND RELATED ART

This invention relates to a technique associated with an oscillator device having an oscillator which is supported for oscillating motion. More particularly, the invention concerns an oscillator device, an optical deflecting device using the same, and a method of detecting the resonance frequency of an oscillation system of an oscillator device. This optical deflecting device can be preferably used in an optical instrument such as an image forming apparatus such as a scanning display unit, a laser beam printer or a digital copying machine, for example.

Resonance type optical deflecting devices conventionally proposed have the following features as compared with optical-scanning optical systems using a rotary polygonal mirror such as a polygon mirror. That is, the size of the optical deflecting device can be reduced remarkably; the power consumption is slow; and there is theoretically no surface tilt of the mirror surface. On the other hand, in the resonance type optical deflecting devices, the resonance frequency of the oscillator of the oscillation system is different by environment such as production variation or temperature.

In conventional resonance type optical deflecting devices, generally the driving is carried out while the driving frequency of the driving signal is fixed at a frequency around the resonance frequency neighborhood. In such devices, by using detecting means for detecting the position of the scanning beam scanningly deflected by the oscillator of the oscillation system or for detecting the displacement angle of the oscillator, the time when the scanning beam arrives at a predetermined scanning position or the time when the oscillator takes a predetermined displacement angle is measured. Then, the system is controlled so that the time in question coincides with a reference time (see Japanese Laid-Open Patent Application No. 2005-292627).

However, if the resonance frequency is different by environment such as production variation or temperature, the resonance frequency of the oscillation system must be detected at the time of starting the driving. As for a method for detecting the resonance frequency of the oscillation system, there is a known method that the driving frequency of the driving signal is changed repeatedly, and a driving frequency which provides a highest efficiency is taken as the resonance frequency (see Japanese Laid-Open Patent Application No. 2005-241482).

SUMMARY OF THE INVENTION

However, in high-efficiency resonance type oscillation systems having an oscillator and a resilient supporting member, if the driving frequency is changed, a certain time is required until the oscillation frequency of the oscillator before being changed becomes equal to the driving frequency. Particularly, in the neighborhood of the resonance frequency, since the driving force is small relative to the inertia force, the change of the oscillation frequency has a time constant and thus the required duration of the oscillation frequency change becomes quite long. For example, if the Q-value of the resonance characteristic of the oscillation system is around 1000, a time of approximately 0.5 seconds may be required adjacent the resonance frequency.

Furthermore, the increment for changing the driving frequency should be set at the frequency accuracy required. Therefore, if the driving frequency set at the first time is largely deviated from the resonance frequency, the driving frequency has to be changed many times so as to find out the resonance frequency. For example, assuming now that the driving frequency is changed 50 times until the resonance frequency is found out and a stand-by time of 0.5 seconds is set at every change, it takes around 25 seconds to find out the resonance frequency. This adversely influences the time for staring the driving when the oscillator device is used in a laser beam printer, for example.

The present invention provides an oscillator device by which a frequency that can be regarded as the resonance frequency of an oscillation system of the oscillator device can be determined in relatively short time based on changing the driving frequency at fewer times. Furthermore, the present invention provides an oscillator device by which a frequency that can be regarded as the resonance frequency can be determined very accurately based on adjusting the increment of changing the driving frequency.

In accordance with an aspect of the present invention, there is provided an oscillator device, comprising: an oscillation system including an oscillator and a resilient supporting member; a driving member configured to supply a driving force to said oscillation system based on a driving signal; a detecting member configured to detect at least an oscillation amplitude of said oscillator; a driving amplitude control unit configured to control at least a driving amplitude of the driving signal; and a driving frequency control unit configured to control a driving frequency of the driving signal to be supplied to said driving member; wherein, in a state in which said driving amplitude control unit controls the driving amplitude of a driving signal so that the oscillation amplitude to be detected becomes equal to a target value, and on the basis of information including driving frequencies in different driving states being driven with driving signals of these driving frequencies as well as the controlled driving amplitude, said driving frequency control unit acquires, as a resonance frequency of said oscillation system, a driving frequency with which the driving amplitude of the driving signal becomes minimal.

The driving frequency control unit may supply a driving signal of the driving frequency acquired as the resonance frequency of said oscillation system to said driving member to causes said driving member to drive said oscillator device so that the oscillation amplitude to be detected becomes equal to a target value.

The oscillator device may further comprise a driving information recording member configured to record a driving frequency and a driving amplitude of a driving signal, wherein, in each of different driving states being driven with respective driving signals of a plurality of driving frequencies, said driving information recording member may record a driving frequency and a driving amplitude of the driving signal with which said oscillator obtains a target oscillation amplitude, and wherein, on the basis of information related to the driving frequencies and driving amplitudes of the recorded driving signals, said driving frequency control unit may acquire, as the resonance frequency of said oscillation system, a driving frequency with which the driving amplitude of the driving signal becomes minimal.

On the basis of the driving frequencies and the driving amplitudes of the driving signals in the driving states based on driving signals of driving frequencies of a number n (n is an integer not less than 3) as recorded by said driving information recording member, said driving frequency control unit may perform "n−1"th order curve interpolation to acquire, as the resonance frequency of said oscillation system, a driving frequency with which the driving amplitude of the driving signal becomes minimal.

On the basis of the driving frequencies and driving amplitudes of the driving signals in the corresponding driving states based on driving signals of at least two driving frequencies as recorded by said driving information recording member as well as a characteristic parameter of said oscillation system measured beforehand, said driving frequency control unit may acquire, as the resonance frequency of said oscillation system, a driving frequency with which the driving amplitude of the driving signal becomes minimal.

The driving frequency control unit may determine a driving frequency of a driving signal to be used subsequently, based on the driving frequency and the driving amplitude recorded in the driving information recording member.

The driving frequency control unit may determine a driving frequency of a driving signal to be used subsequently, so that the driving amplitude of a driving signal having a central driving frequency among three consecutive driving frequencies becomes smaller than the driving amplitudes of the driving signals of the other driving frequencies.

When the driving frequency of the driving signal is to be changed, said driving frequency control unit may determine a driving frequency of a driving signal to be used subsequently, on the basis of magnitude comparison between the driving amplitude of a driving signal of a current driving frequency and the driving amplitude of a driving signal of a previous driving frequency.

The driving frequency control unit may determine the driving frequency of a driving signal to be used subsequently, based on a driving phase of said oscillator relative to the phase of a driving signal of a current driving frequency.

The oscillation system may include a plurality of oscillators and a plurality of resilient supporting members, wherein a resonance frequency thereof may have a fundamental frequency of fundamental wave and an n-fold frequency of an n-fold wave which is approximately n-fold the fundamental frequency (n is an integer not less than 2), wherein said driving frequency control unit may supply, to said driving member, driving signals having components of driving frequencies of a ratio of 1:n corresponding to the fundamental wave and the n-fold wave, respectively, to cause said driving member to drive said oscillation system, wherein said detecting member detects the oscillation amplitude of the oscillation component corresponding to the fundamental wave or n-fold wave of said oscillator of said oscillation system, wherein said driving amplitude control unit may control the driving amplitude of a component corresponding to the fundamental wave or n-fold wave of the driving signal, wherein, in the state in which said driving amplitude control unit controls the driving amplitude of a component corresponding to the fundamental wave or the n-fold wave of the driving signal so that the detected oscillation amplitude of the oscillation component corresponding to the fundamental wave or n-fold wave of said oscillator becomes equal to a target value, and on the basis of information including driving frequencies of components corresponding to a plurality of fundamental waves or n-fold waves in respective driving states being driven by driving signals of these driving frequencies as well as the controlled driving amplitude, said driving frequency control unit may acquire, as a resonance frequency of the fundamental wave or n-fold wave of said oscillation system, a driving frequency with which the driving amplitude of the component corresponding to the fundamental wave or n-fold wave of the driving signal becomes minimal.

In accordance with another aspect of the present invention, there is provided an oscillator device, comprising: an oscillation system including an oscillator and a resilient supporting member; a driving member configured to supply a driving force to said oscillation system based on a driving signal; a detecting member configured to detect at least an oscillation amplitude of said oscillator; a driving amplitude control unit configured to control at least a driving amplitude of the driving signal; and a driving frequency control unit configured to control a driving frequency of the driving signal to be supplied to said driving member; wherein, in a state in which said driving amplitude control unit controls and maintains the driving amplitude of the driving signal constant, and on the basis of information including driving frequencies in different driving states being driven with driving signals of these driving frequencies as well as the oscillation amplitude of said oscillator detected by said detecting member, said driving frequency control unit acquires, as the resonance frequency of said oscillation system, a driving frequency of a driving signal with which the oscillation amplitude of said oscillator becomes maximal.

The oscillation system in this aspect may include a plurality of oscillators and a plurality of resilient supporting members, wherein a resonance frequency thereof may have a fundamental frequency of fundamental wave and an n-fold frequency of an n-fold wave which is approximately n-fold the fundamental frequency (n is an integer not less than 2), wherein said driving frequency control unit may supply, to said driving member, driving signals having components of driving frequencies of a ratio of 1:n corresponding to the fundamental wave and the n-fold wave, respectively, to cause said driving member to drive said oscillation system, wherein said detecting member may detect the oscillation amplitude of an oscillation component corresponding to the fundamental wave or n-fold wave of said oscillator of said oscillation system, wherein said driving amplitude control unit may control the driving amplitude of a component corresponding to the fundamental wave or n-fold wave of the driving signal, wherein, in the state in which said driving amplitude control unit controls and maintains constant the driving amplitude of a component corresponding to the fundamental wave or the n-fold wave of the driving signal, and on the basis of information including driving frequencies of components corresponding to a plurality of fundamental waves or n-fold waves in respective driving states being driven by these driving frequencies as well as the driving amplitude corresponding to the fundamental wave or n-fold wave of said oscillator as detected by said detecting member, said driving frequency control unit may acquire, as a resonance frequency of the fundamental wave or n-fold wave of said oscillation system, a driving frequency of a component corresponding to the fundamental wave or n-fold wave of the driving signal with which the oscillation amplitude of the oscillation component corresponding to the fundamental wave or n-fold wave of said oscillator becomes maximal.

In accordance with a further aspect of the present invention, there is provided an optical deflecting device, comprising: an oscillator device as recited above; and an optical deflection element disposed on at least one said oscillator to deflect a light beam incident on said optical deflection element.

In accordance with a yet further aspect of the present invention, there is provided an optical instrument including an optical deflecting device as recited above, wherein said optical deflecting device may be configured to deflect a light beam from a light source so that at least a portion of the light beam is incident on an object to be irradiated by light.

In accordance with a still further aspect of the present invention, there is provided a method of detecting a resonance frequency of an oscillation system of an oscillator device including the oscillation system having an oscillator and a resilient supporting member, and a driving member configured to supply a driving force to the oscillation system based on a driving signal, characterized in that: in a state in which a driving amplitude of a driving signal is controlled so that an oscillation amplitude of the oscillator driven by the driving member becomes equal to a target value, the oscillator is driven by driving signals of a plurality of driving frequencies sequentially; and on the basis of information including the plurality of driving frequencies in respective driving states being driven with driving signals of these driving frequencies as well as the controlled driving amplitude, a driving frequency with which the driving amplitude of the driving signal becomes minimal is acquired as the resonance frequency of the oscillation system.

In accordance with another aspect of the present invention, there is provided a method of detecting a resonance frequency of an oscillation system of an oscillator device including the oscillation system having an oscillator and a resilient supporting member, and a driving member configured to supply a driving force to the oscillation system based on a driving signal, characterized in that: in a state in which a driving amplitude of a driving signal is controlled and maintained constant, the oscillator is driven by driving signals of a plurality of driving frequencies sequentially and an oscillation amplitude of the oscillator is detected; and on the basis of information including the plurality of driving frequencies in respective driving states being driven with driving signals of these driving frequencies as well as the detected oscillation amplitude of the oscillator, a driving frequency with which the oscillation amplitude of the oscillator becomes maximal is acquired as the resonance frequency of the oscillation system.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
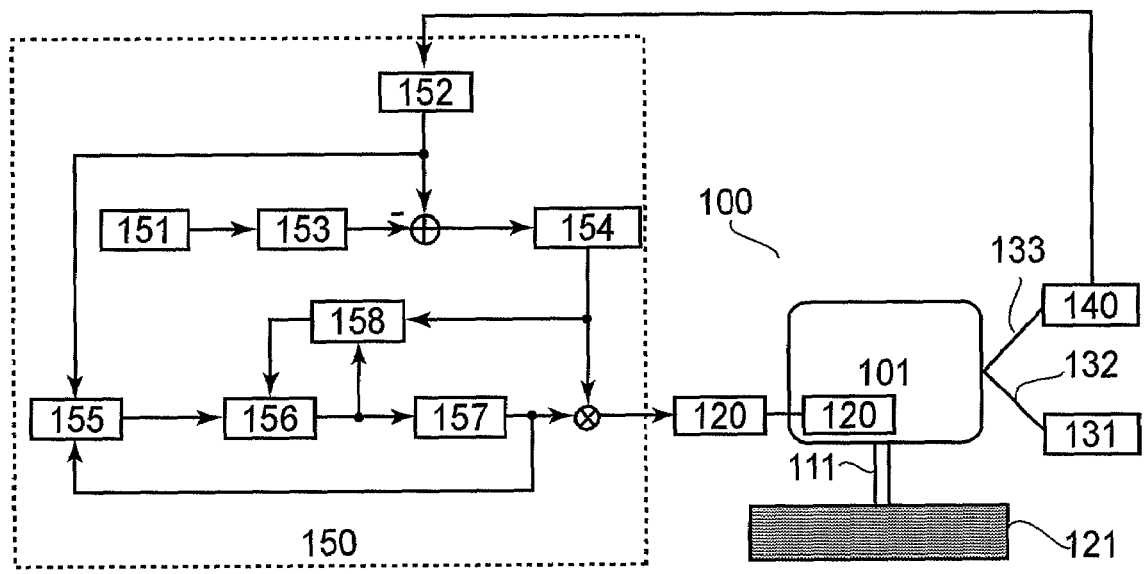
FIG. 1 shows is a schematic diagram showing an optical deflecting device using an oscillator device according to a first embodiment of the present invention.

The present invention concerns a technique for acquiring the resonance frequency based on such characteristic that the driving efficiency becomes maximal when the oscillation system having a natural oscillation mode is driven at the resonance frequency of the natural oscillation mode.

A first method using this characteristic may be that, in the state in which the oscillation amplitude of the oscillator of the oscillation system is controlled at a target value, which driving frequency can provide a driving signal having minimal driving amplitude is detected and such driving frequency is regarded as the resonance frequency to be acquired. An example based on this method will be described later with reference to the first embodiment.

A second method may be that, in the state in which the driving amplitude of the driving signal controlled to be constant, which driving frequency can provide maximal oscillation amplitude of the oscillator of the oscillation system is detected and such driving frequency is regarded as the resonance frequency to be acquired. An example based on this method will be described later with reference to the third embodiment.

These methods are those utilizing the phenomenon based on the aforementioned characteristic in different ways, but these are based on essentially the same principle.

An oscillator device according to the aforementioned first method may comprise an oscillation system, a driving member for supplying a driving force to the oscillation system, a detecting member (means) for detecting the oscillation amplitude of the oscillator, a driving amplitude control unit for controlling the driving amplitude of the driving signal, and a driving frequency control unit for controlling the driving frequency of the driving signal to be supplied to the driving member. In a state in which the driving amplitude control unit controls the driving amplitude of a driving signal so that the oscillation amplitude to be detected by the detecting means becomes equal to a target value, and on the basis of information including driving frequencies in different driving states being driven with driving signals of these driving frequencies as well as the controlled driving amplitude, the driving frequency control unit acquires, as a resonance frequency of the oscillation system, a driving frequency with which the driving amplitude of the driving signal becomes minimal.

Furthermore, a method of detecting a resonance frequency of an oscillator device having an oscillation system and a driving member, according to the aforementioned first method may include the following procedure: that is, in a state in which a driving amplitude of a driving signal is controlled so that an oscillation amplitude of the oscillator driven by the driving member becomes equal to a target value, the oscillator is driven by driving signals of a plurality of driving frequencies sequentially; and on the basis of information including the plurality of driving frequencies in respective driving states being driven with driving signals of these driving frequencies as well as the controlled driving amplitude, a driving frequency with which the driving amplitude of the driving signal becomes minimal is acquired as the resonance frequency of the oscillation system.

An oscillator device according to the aforementioned second method may comprise an oscillation system, a driving member for supplying a driving force to the oscillation system, a detecting member (means) for detecting the oscillation amplitude of the oscillator, a driving amplitude control unit for controlling the driving amplitude of the driving signal, and a driving frequency control unit for controlling the driving frequency of the driving signal to be supplied to the driving member, wherein, in a state in which the driving amplitude control unit controls and maintains the driving amplitude of the driving signal constant, and on the basis of information including driving frequencies in different driving states being driven with driving signals of these driving frequencies as well as the oscillation amplitude of the oscillator detected by the detecting member, the driving frequency control unit acquires, as the resonance frequency of said oscillation system, a driving frequency of a driving signal with which the oscillation amplitude of the oscillator becomes maximal.

Furthermore, a method of detecting the resonance frequency of an oscillator device having an oscillation system and a driving member according to the aforementioned second method may comprise the following procedure: that is, in a state in which a driving amplitude of a driving signal is controlled and maintained constant, the oscillator is driven by driving signals of a plurality of driving frequencies sequentially and an oscillation amplitude of the oscillator is detected; and on the basis of information including the plurality of driving frequencies in respective driving states being driven with driving signals of these driving frequencies as well as the detected oscillation amplitude of the oscillator, a driving frequency with which the oscillation amplitude of the oscillator becomes maximal is acquired as the resonance frequency of the oscillation system.

As a matter of course, these two methods may be applied to an oscillation system having a single oscillator to acquire the resonance frequency thereof. However, these may be applied also to an oscillation system having a plurality of oscillators to acquire the resonance frequency thereof. In the latter case, if it is desired to acquire a certain resonance frequency among a plurality of natural oscillation modes of the latter oscillation system, the following procedure may be done. That is, while paying attention to the oscillation amplitude of the component of the oscillatory motion corresponding to the natural oscillation mode of that resonance frequency, the driving frequency and the driving amplitude of the component of the driving signal, these are treated like the oscillation amplitude, driving frequency and driving amplitude in the aforementioned two methods. Then, a frequency that can be regarded as a desired resonance frequency of the oscillation system having a plurality of oscillators can be acquired. Such an example will be described later with reference to a second embodiment.

Preferred embodiments of the present invention will now be described with reference to the attached drawings.

First Embodiment

FIG. 1 is a schematic diagram of a first embodiment when the present invention is applied to an optical deflecting device.

In this embodiment, an optical deflection unit (optical scanner) comprises an oscillation system 100 including one oscillator 101 and a torsion spring 111 which is a resilient supporting member, and a supporting member 121 for supporting the oscillation system. The optical deflection device is configured so that a driving member 120 receives a driving signal and, in response, it supplies a driving force to the oscillation system 100 based on an electromagnetic system, electrostatic system or piezoelectric system. In the case of electromagnetic driving, as an example, a permanent magnet may be mounted on the oscillator and an electric coil for applying a magnetic field to this permanent magnet may be disposed adjacent the oscillator. The disposition of the permanent magnet and the electric coil may be reversed. In the case of electrostatic driving, an electrode may be formed on the oscillator, and an electrode effective to produce an electrostatic force acting between it and the former electrode may be formed adjacent the oscillator. In the case of piezoelectric driving, a piezoelectric element may be provided at the oscillation system or a fixed supporting member of the oscillation system to apply a driving force thereto.

The oscillator 101 has formed thereon an optical deflection element such as a reflecting mirror, and it deflectively reflects a light beam 132 from a light source 131 to scan the same. In this way, an optical deflection element is provided on the oscillator, and an optical deflecting device for deflecting a light beam incident on an optical deflection element is accomplished. Furthermore, the scanning light 133 passes through a light receiving element 140 constituting a detecting member (means), twice during a single scan period. A control unit 150 generates a driving signal based on the time when the scanning light 133 passes the light receiving element 140, and this driving signal is supplied to the driving member 120.

Figure 2:
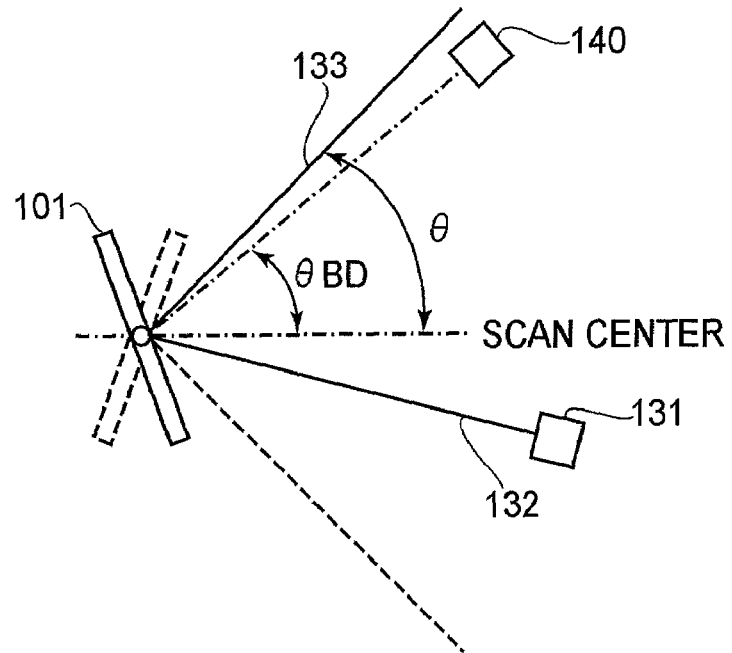
FIG. 2 is a diagram illustrating the deflection angle of the optical deflecting device of the first embodiment.

FIG. 2 illustrates the deflection angle of the scanning light 133 by the reflecting mirror of the oscillator 101 of the optical deflecting device. The light receiving element 140 of the optical scanner is disposed at a position (position of a set angle θBD from the scan center) whereat it can receive the scanning light 133 having a deflection angle smaller than the maximum deflection angle of the optical scanner. Although in FIG. 2 the light receiving element 140 is disposed on the light path of the optical scanner in FIG. 2, the light receiving element 140 may be disposed on the light path of the scanning light deflected furthermore by a separate reflecting mirror.

The structure and operation of the control unit 150 will be explained in detail.

Figure 3:
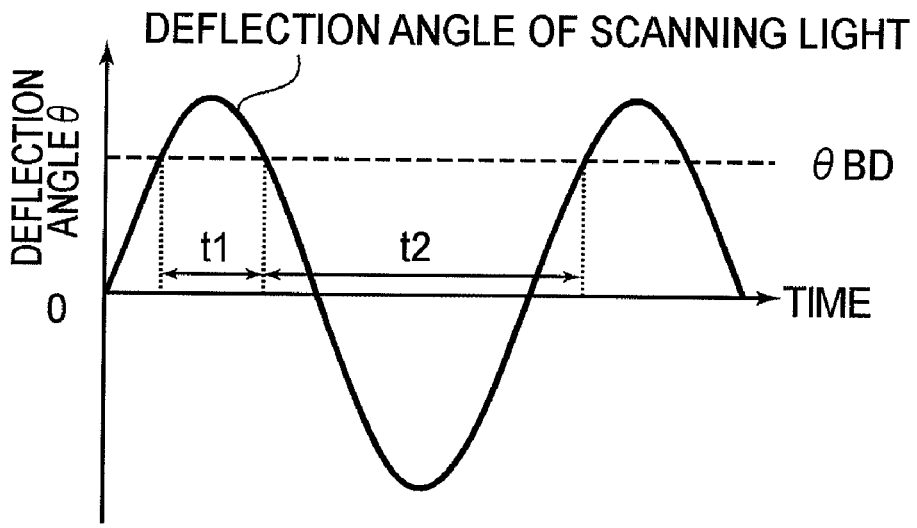
FIG. 3 is a diagram illustrating the change with respect to time of the deflection angle of the optical deflecting device.

A time measuring member 152 which constitutes a detecting member (means) takes an output signal of the light receiving element 140 to measure time t1 and time t2 related to the detection time moment of the scanning light 133. FIG. 3 illustrates changes with respect to time of the deflection angle θ of the scanning light 133 by the optical scanner as well as time t1 and t2 mentioned above which concern the time moments whereat the scanning light 133 passes the set angle θBD at the setting position of the light receiving element 140. As regards the method of discrimination between time t1 and time t2, one with which the time of the detection time moment becomes not greater than a half period of the driving signal is taken as t1, while the other is taken as t2. The change with respect to time of the deflection angle θ of the scanning light 133 corresponds to the oscillatory motion that the oscillator 101 oscillates with a certain oscillation frequency.

A driving amplitude control unit 154 controls the amplitude of the driving signal to be supplied to the driving member 120, based on the difference Δt1 between the detection time t1 shown in FIG. 3 and a target time 153 set by the controller 151. On the other hand, a waveform generator 157 generates a waveform of the driving frequency set by the driving frequency control unit 156. Here, since the amplitude of the driving signal and the driving phase ø to be described later should be fixed based on the output of the time measuring unit 152 as described above, the detecting member should have only such structure that a single light receiving element 140 is provided to measure detection time t1 and detection time t2.

Figure 5:
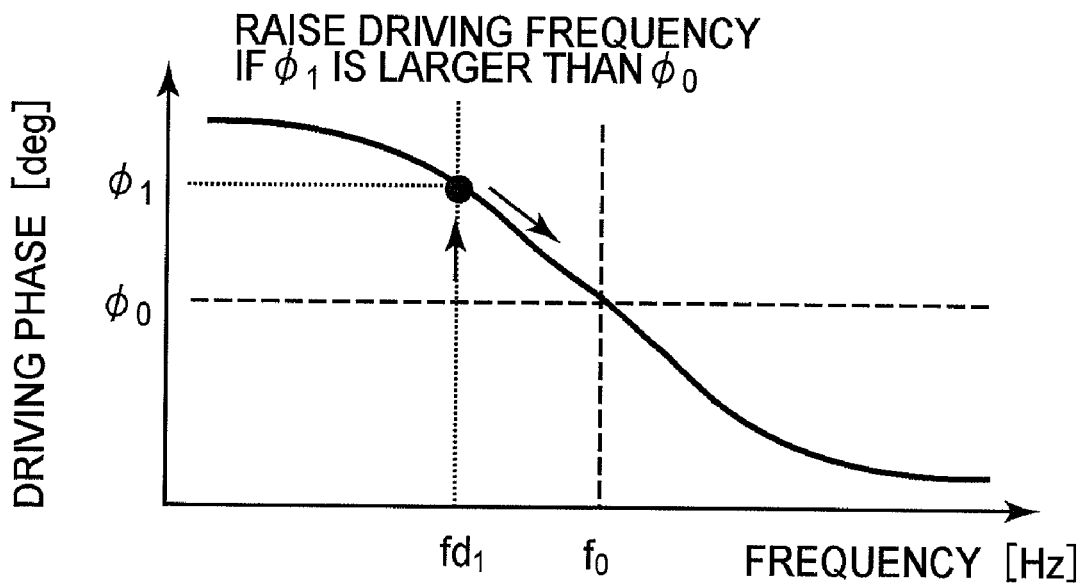
FIG. 5 is a diagram illustrating the changing of the driving frequency of the driving signal based on the driving phase comparison, in the first embodiment.

Furthermore, a driving phase detecting member 155 detects the driving phase ø of the oscillator 101 based on the detection times t1 and t2 as outputted from the time measuring unit 152 as well as the waveform outputted from the waveform generator 157. The driving phase ø is the phase of the oscillatory motion of the oscillator 101 relative to the phase of the driving signal. As shown in FIG. 5, if the driving frequency is smaller than the resonance frequency, the driving phase ø becomes larger than the driving phase $ø_0$ when the driving frequency is at the resonance frequency f0. If the driving frequency is larger than the resonance frequency, the driving phase becomes smaller than $ø_0$.

A driving information recording member 158 records the amplitude of a driving signal controlled by the driving amplitude control unit 154 so that the oscillation amplitude of the oscillator 101 of the oscillation system 100 becomes equal to a target amplitude, as well as the driving frequency fd set in the waveform generator 157 by the driving frequency control unit 156. In this embodiment, based on the amplitude and the driving frequency of the driving signal as recorded by the driving information recording member 158 and the driving phase ø detected by the driving phase detecting member 155, the driving frequency control unit 156 determines the driving frequency fd and sets the same in the waveform generator 157. More specifically, the driving frequency control unit 156 determines the driving frequency of a subsequent driving signal to be used subsequently, based on the driving phase of the oscillator relative to the phase of the driving signal of the current driving frequency.

Figure 4:
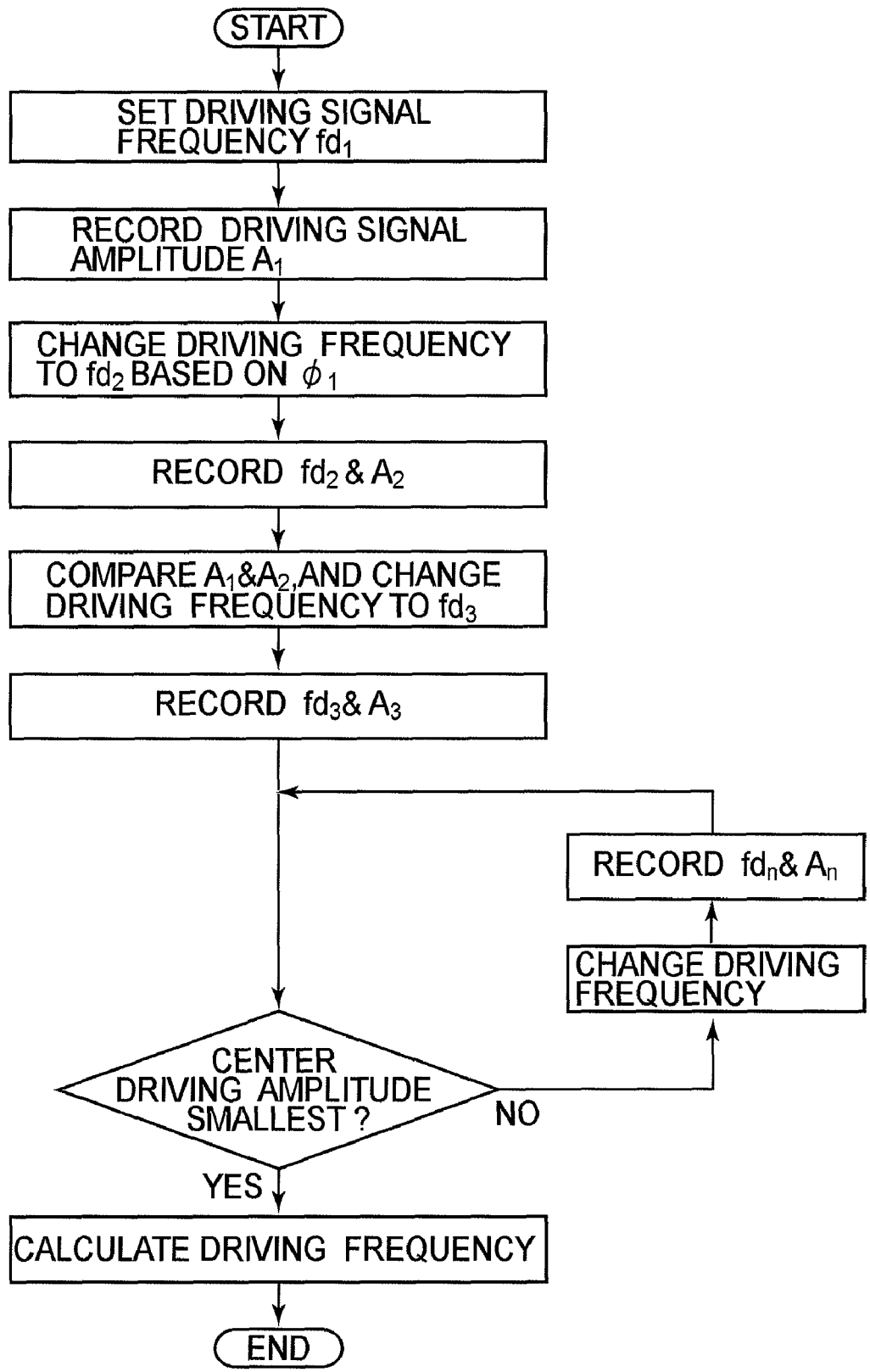
FIG. 4 is a diagram showing the flow of the operation outline of the optical deflecting device of the first embodiment.

FIG. 4 illustrates an operation flow of the driving frequency control unit 156 and the driving information recording member 158 in the present embodiment. Description will be made to follow the flow. At the time of the driving start, the driving frequency control unit 156 sets, in the waveform generator 157*a*, a driving frequency fd1 based on the resonance frequency at the time of production and/or a driving frequency at the previous driving, and it starts the driving. For example, the resonance frequency at the time of production or the driving frequency at the previous driving may be just used or, alternatively, these may be set while taking into account the temperature at that time (generally, the resonance frequency decreases with a temperature rise). This setting may be carried out automatically at the apparatus side, or it may be set manually by an operator. The driving amplitude control unit 154 controls the driving signal amplitude $A_1$ so that at the driving frequency $fd_1$ the oscillator 101 of the oscillation system 100 obtains a target oscillation amplitude. The driving information recording member 158 records the driving frequency $fd_1$ and the driving signal amplitude $A_1$ at that time.

FIG. 5 illustrates the direction of the driving frequency change based on the driving phase comparison. The driving frequency control unit 156 compares the driving phase ø1 detected by the driving phase detecting member 155 with the driving phase $ø_0$ (this being measured and stored beforehand) as driven at the resonance frequency $f_0$. If as a result of this the current driving phase $ø_1$ is larger than the driving phase $ø_0$ at the resonance frequency $f_0$ the driving frequency control unit 156 sets, in the waveform generator 157, a driving frequency $fd_2$ in which the frequency is increased by a predetermined frequency changing increment $f_{add}$ from the driving frequency $fd_1$. On the contrary, if the current driving phase $ø_1$ is smaller than the driving phase $ø_0$ at the resonance frequency $f_0$, the driving frequency control unit 156 sets, in the waveform generator 157, a driving frequency $fd_2$ in which the frequency is decreased by a predetermined frequency changing increment (decrement) $f_{add}$. In this case as well, like the case where the driving frequency is $fd_1$, the driving information recording member 158 records a driving signal amplitude $A_2$ with which the oscillator 101 of the oscillation system 100 obtains a target amplitude at the driving frequency $fd_2$, as well as this driving frequency $fd_2$.

The frequency changing increment $f_{add}$ may be determined while taking into account the temperature change from the previous driving, the estimated times of the frequency changing operation, and/or a required resonance frequency precision. For example, if it is expected that, due to the temperature change from the previous driving, the resonance frequency has been changed by about αHz and, while setting the driving frequency $fd_1$ at the value being changed, the frequency change should be done three times including the initial setting, the frequency changing increment $f_{add}$ may be α/2 Hz or more. Furthermore, if the frequency changing should be done twice including the initial one, the frequency changing increment $f_{add}$ may be αHz or more. In other words, after beginning with the initially set driving frequency, the frequency changing increment should be set so as become over the resonance frequency until the last driving frequency is set.

Figure 6:
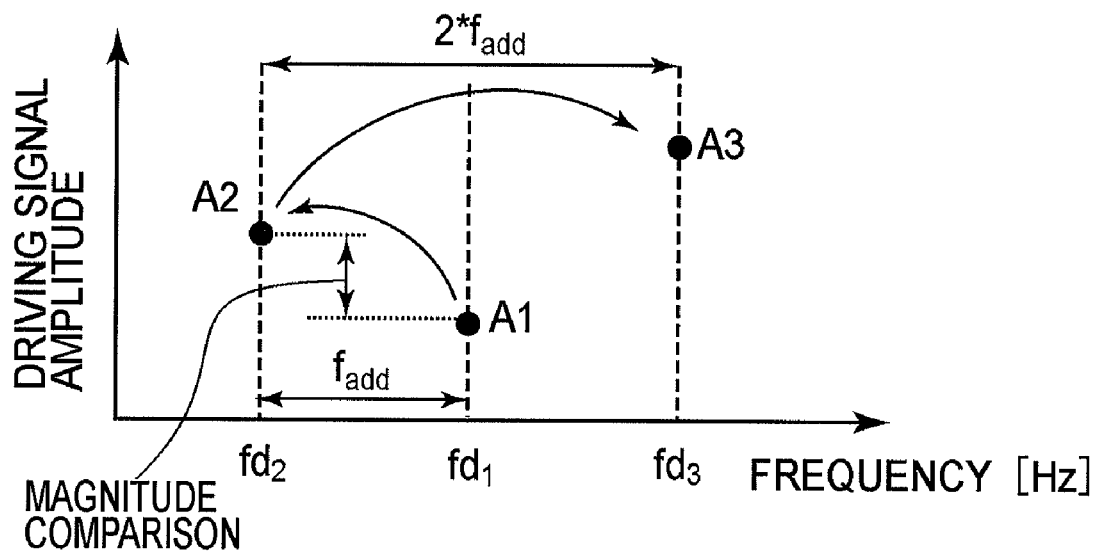
FIG. 6 is a diagram illustrating the changing of the driving frequency of the driving signal based on the comparison of the driving signal amplitude, in the first embodiment.
Figure 7:
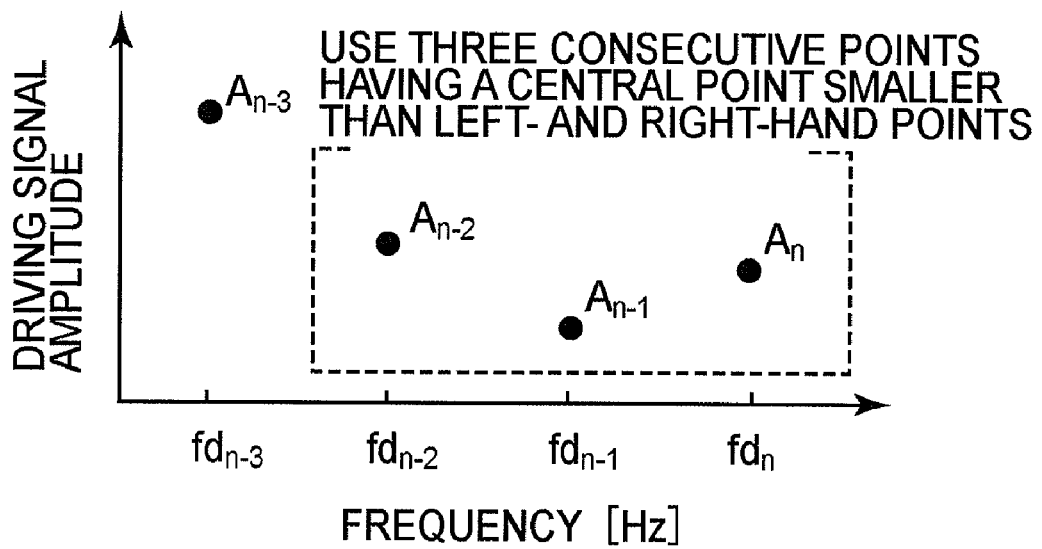
FIG. 7 is a diagram showing three driving frequencies to be used for quadratic-curve interpolation, in the first embodiment.

FIG. 6 and FIG. 7 illustrate the direction of the driving frequency change based on the comparison of the driving signal amplitude. This is not applicable at the time of the initial driving frequency change. For the initial driving frequency change, the method based on the driving phase comparison mentioned hereinbefore may be applied. The driving frequency control unit 156 compares the magnitudes of the driving amplitude signal $A_2$ and the driving amplitude signal $A_1$ recorded in the driving information recording member 158. If as a result of this $A_1$ is larger than $A_2$, a driving frequency $fd_3$ being changed by a predetermined frequency changing increment $f_{add}$ in the same direction as the previous frequency changing is set in the waveform generator 157 (see driving signal amplitudes $A_n$, $A_{n-1}$ and $A_{n-2}$ in FIG. 7). In the case of FIG. 7, since the driving phase is larger than the driving phase $ø_0$ at the resonance frequency $f_0$, the driving frequencies $fd_{n-3}$, $fd_{n-2}$ and $fd_{n-1}$ are made larger in sequence in this order.

On the contrary, if $A_1$ is smaller than $A_2$ as shown in FIG. 6, in this embodiment, the driving frequency control unit 156 sets, in the waveform generator 157, a driving frequency $fd_3$ in which the frequency has been changed by two-fold the frequency changing increment $f_{add}$ in the direction opposite to the direction of the previous frequency change. In this case, since the driving phase $ø_1$ is smaller than the driving phase $ø_0$ at the resonance frequency $f_0$, the driving frequency $fd_2$ has been lowered from the driving frequency $fd_1$. However, since the driving phase $ø_2$ is larger than the driving phase $ø_0$, the driving frequency $fd_3$ has been raised from the driving frequency $fd_2$. In this case as well, like the case where the driving frequency is $fd_1$, the driving information recording member 158 records a driving signal amplitude $A_3$ with which the oscillator 101 of the oscillation system 100 obtains a target oscillation amplitude at the driving frequency $fd_3$. In this manner, the driving frequency control unit 156 determines the driving frequency of a subsequent driving signal on the basis of the driving frequency and driving amplitude of the driving signal recorded in the driving information recording member 158. More specifically, when the driving frequency of the driving signal is going to be changed, the driving frequency control unit 156 determines the driving frequency of a subsequent driving signal on the basis of the magnitude comparison of the driving amplitude of the driving signal of the current driving frequency and the driving amplitude of the driving signal of the previous driving frequency.

Subsequently, the driving frequency control unit 156 compares, with $A_3$, the driving signal amplitude being recorded at the time of one driving frequency, among the driving frequencies $fd_1$ and $fd_2$ recorded in the driving information recording member 158, which one driving frequency is close to the driving frequency $fd_3$. If, as a result of this, $A_3$ is larger, then, based on the driving frequencies and driving amplitudes recorded in the driving information recording member 158 and by using equations (1-1), (1-2) and (1-3) below, quadratic curve interpolation is performed to determine a driving frequency $fd_0$ corresponding to the resonance frequency with which the driving amplitude A becomes minimal. IN this manner, the driving frequency $fd_0$ which can be regarded as the resonance frequency can be acquired. Here, in the following equations, "a" is a coefficient of secondary term of a quadratic equation passing through three points in FIG. 6, and similarly "b" is a coefficient of primary term.

$$a = \frac{fd_1 \times (A_3 - A_2) - fd_2 \times A_3 + fd_3 \times A_2 + (fd_2 - fd_3) \times A_1}{fd_1 \times (fd_3^2 - fd_2^2) - fd_2 \times fd_3^2 + fd_2^2 \times fd_3 + fd_1^2 \times (fd_2 - fd_3)} \quad (1\text{-}1)$$

$$b = -\frac{fd_1^2 \times (A_3 - A_2) - fd_2^2 \times A_3 + fd_3^2 \times A_2 + (fd_2^2 - fd_3^2) \times A_1}{fd_1 \times (fd_3^2 - fd_2^2) - fd_2 \times fd_3^2 + fd_2^2 \times d_3 + fd_1^2 \times (fd_2 - fd_3)} \quad (1\text{-}2)$$

$$fd_0 = -\frac{b}{2a} \quad (1\text{-}3)$$

Furthermore, in this embodiment, the driving frequency control unit 156 sets the driving frequency $fd_0$ in the waveform generator 157. The control unit 150 drives so that, at the driving frequency $fd_0$ set in the waveform generator 157, the oscillation amplitude of the oscillator 101 reaches a predetermined value. In this manner, the driving frequency control unit 156 supplies a driving signal of a driving frequency acquired as the resonance frequency of the oscillation system, to the driving member 120 thereby to cause the driving member 120 to drive the oscillator 101 so that the oscillation amplitude detected by the detecting means reaches a target value. The driving frequency control unit 156 may intentionally set a driving frequency deviated from the driving frequency $fd_0$ by a specified value, in the waveform generator 157 to drive the oscillator 101.

On the contrary, if $A_3$ is smaller, further driving frequency changing is carried out so that the driving signal amplitude at a central frequency becomes lower than the other two driving signal amplitudes as depicted in the zone surrounded by a broken line in FIG. 7, and the driving signal amplitude is recorded in the driving information recording member 158. More specifically, a driving frequency $fd_n$ in which the frequency has been changed by $f_{add}$ in the same direction as the previous driving frequency changing is set in the waveform generator 157. Furthermore, the driving information recording member 158 records a driving signal amplitude $A_n$ with which the oscillation system obtains a target amplitude at the driving frequency $fd_n$. Then, the driving frequency control unit 156 repeats the frequency changing until the driving signal amplitude $A_{n-1}$ become lower than the driving signal amplitude $A_n$. After that, based on the driving frequencies $fd_n$, $fd_{n-1}$ and $fd_{n-2}$ and driving amplitudes $A_n$, $A_{n-1}$ and $A_{n-2}$ recorded in the driving information recording member 158, quadratic curve interpolation is performed in accordance with equations similar to equations (1-1), (1-2) and (1-3) mentioned hereinbefore, and a driving amplitude with which the driving frequency $fd_0$ becoming minimal is determined. In this manner, the driving frequency control unit 156 determines the driving frequency of a subsequent driving signal so that the driving amplitude of the driving signal of a central driving frequency, among three consecutive different driving frequencies, becomes lower than the driving amplitudes of the driving signals of the other driving frequencies.

The oscillator device according to the present embodiment described above comprises a driving information recording member 158 for recording the driving frequency and the amplitude of a driving signal. This driving information recording member is so configured that, when the oscillator device is sequentially driven in different driving states by driving signals of a plurality of driving frequencies, it records the driving frequencies and the amplitudes of the driving signals, in the respective driving states, with which the oscillator 101 obtains a target oscillation amplitude. Then, on the basis of the information related to the driving frequency and the driving amplitude of the plurality of driving signals recorded, the driving frequency control unit 156 acquires a driving frequency with which the driving amplitude of the driving signal becomes minimal, as the resonance frequency of the oscillation system 100.

In this embodiment, if among the three driving frequencies the driving signal amplitude of the central driving frequency is not lower than the other driving signal amplitudes, the driving frequency is changed furthermore in the same direction and then the driving signal magnitude is measured. However, this process may not always be performed. For example, if an approximate location of the resonance frequency position is predicted, the quadratic curve interpolation similar to that mentioned above may be performed taking into account the prediction, thereby to determine the driving frequency $fd_0$ corresponding to the resonance frequency. Furthermore, viewing the rate of change of the driving signal amplitude (e.g., the rate of change being gradually decreased), the quadratic curve interpolation similar to that mentioned above may be performed to determine the driving frequency $fd_0$ corresponding to the resonance frequency.

Furthermore, although in this embodiment driving signal amplitudes of three driving frequencies are used, the number is not limited to three. By using driving signal amplitudes of a plurality (a number n where n is an integer not less than 4) of driving frequencies, "n−1"th curve interpolation may be performed. Namely, in that case, the driving frequency control unit may perform "n−1"th curve interpolation based on the driving frequencies and driving amplitudes of driving signals in respective driving states being driven by these driving signals of a number n (n is an integer not less than 3) recorded in the driving information recording member. Then, a driving frequency with which the driving amplitude of the driving signal becomes minimal is acquired as the resonance frequency of the oscillation system.

Alternatively, on the basis of driving signal amplitudes of two or more driving frequencies recorded by the driving information recording member 158 as well as a parameter (e.g. Q-value) of the oscillation system 100 measured beforehand, the frequency with which the amplitude of the driving signal becomes becoming minimal may be determined. For example, by using driving signal amplitudes at two or more driving frequencies and based on a table or any other function prepared while taking into account the parameter of the oscillation system 100, a driving frequency with which the amplitude A of the driving signal becomes minimal may be determined. For example, the rate of change of the driving signal amplitude may be detected from driving signal amplitudes of a plurality (two or more) of driving frequencies, and then the driving frequency with which the amplitude A becomes minimal may be determined based on a table of the rate of change and a deviation amount of the frequency of the smallest amplitude, among plural driving frequencies, from the driving frequency having minimal amplitude A.

Furthermore, if the Q-value which is the parameter of the resonance characteristic of the oscillation system less fluctuates by the environment, the value "a" obtainable with equation (1-1) may be a fixed value. From the fixed value "a", driving frequencies $fd_1$ and $fd_2$ and driving signal amplitudes $A_1$ and $A_2$, quadratic curve interpolation may be performed using equation (1-4) below and equation (1-3) mentioned above, the driving frequency $fd_0$ with which the amplitude A of the driving signal corresponding to the resonance frequency becomes minimal may be determined. More specifically, on the basis of the driving frequencies and driving amplitudes of driving signals in respective driving states being driven with these driving signals of two or more driving frequencies as well as the characteristic parameter of the oscillation system measured beforehand, the driving frequency control unit acquires a driving frequency with which the driving amplitude becomes minimal, as the resonance frequency of the oscillation system.

$$b = \frac{-A_2 + A_1 + a \times fd_2^2 - a \times fd_1^2}{fd_1 - fd_2} \quad (1\text{-}4)$$

Furthermore, the driving frequency change increment $f_{add}$ may be determined arbitrarily based on the precision for determination of the driving frequency $f_0$ and the variable range of the resonance frequency. Although in this embodiment the driving frequency changing increment $f_{add}$ has a constant value, $f_{add}$ may be changed at every frequency change. For example, the changing increment $f_{add}$ may be changed taking into account the rate of change of the driving signal amplitude (e.g., in proportion to the rate of change).

Furthermore, although in this embodiment the driving phase is used to determine the subsequent driving frequency $fd_2$, the driving frequency $fd_2$ may be determined without the use of judgment based on the driving phase. For example, the process may be started at a driving frequency lower than the resonance frequency the approximate location of which has been predetected, and a subsequent driving frequency $fd_2$ may be changed in a certain direction (a direction to enlarge). Furthermore, the driving frequency changing direction may be determined taking into account the rate of change of the driving signal amplitude.

With regard to the recording of the driving signal amplitude, there may be a stand-by time after the driving frequency is changed and before the oscillator 101 oscillates at that frequency. Furthermore, the driving information recording member 158 may record an average of the driving signal amplitudes during a predetermined time after the change.

Although in this embodiment the oscillation frequency of the oscillator 101 is detected using the scanning light 133 and the light receiving element 140, a certain detector such as a piezoelectric element for detecting the oscillation frequency may be used. For example, a piezo-sensor may be mounted on the elastic supporting member 111 or, alternatively, an electrostatic capacitance sensor or a magnetic sensor may be used.

In accordance with the present embodiment, by suitably performing the setting of the initial driving frequency and the setting of the frequency changing increment, a frequency which can be regarded as the resonance frequency of the oscillation system of the oscillator device can be determined based on a fewer number of driving frequency change. By adjusting the increment of the driving frequency change, a frequency which can be regarded as the resonance frequency can be determined at high precision.

Second Embodiment

Figure 8:
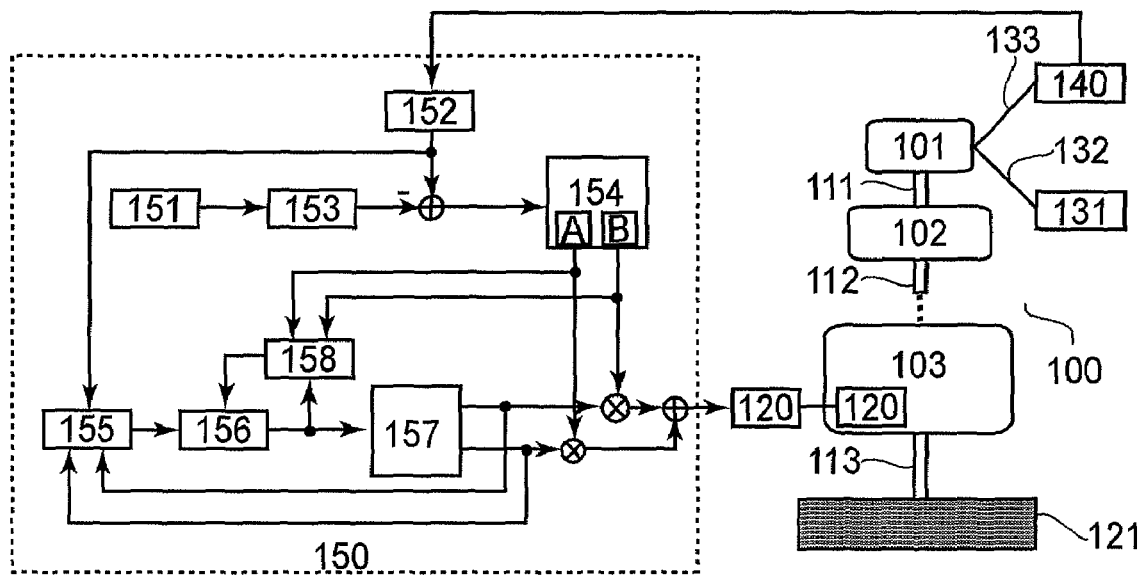
FIG. 8 is a schematic diagram showing an optical deflecting device using an oscillator device according to a second embodiment of the present invention.

FIG. 8 is a schematic diagram of a second embodiment when the present invention is applied to an optical deflecting device.

In this embodiment, the optical deflection unit (optical scanner) is comprised of an oscillation system including at least a first oscillator 101, a second oscillator 102, a first torsion spring 111 and a second torsion spring 112, and a supporting member 121 for supporting the oscillation system 100. The first torsion spring 111 which is a resilient supporting member connects the first oscillator 101 and the second oscillator 102 each other. The second torsion spring 112 which is a resilient supporting member is connected to the second oscillator 102 so as to have a torsional axis coinciding with the torsional axis of the first torsion spring 111. The oscillation system 100 of the present embodiment is comprised of at least two oscillators and two torsion springs. The oscillation system may be comprised of three or more oscillators and three or more torsion springs such as shown in FIG. 8.

In this embodiment, the first oscillator 101 is provided with a reflecting mirror on the surface thereof, to scan a light beam 132 from a light source 131. The function of the driving member 120 and the operation of the control unit 150 are basically similar to those of the first embodiment.

Figure 9:
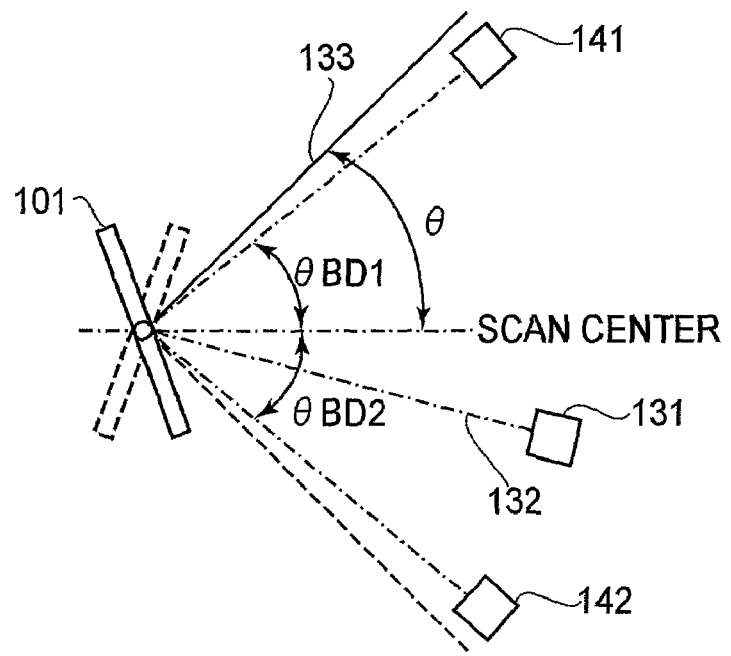
FIG. 9 is a diagram illustrating the deflection angle of the optical deflecting device of the second embodiment.

FIG. 9 illustrates the deflection angle of the scanning light 133 by the reflecting mirror of the first oscillator 101 of the optical deflecting device. The optical scanner comprises first and second light receiving elements 141 and 142 which are disposed at positions (positions of set angle θBD1 and set angle θBD2) whereat these can receive the scanning light 133 of a deflection angle smaller than the maximum deflection angle of the optical scanner. In this example as well, the first and second light receiving elements 141 and 142 are disposed on the light path of the optical scanner in FIG. 9. However, the first and second light receiving elements 141 and 142 may be disposed on the light path of the scanning light as deflected furthermore by a separate reflecting mirror. Here, based on the output of the time measuring member 152, it is necessary to detect at least two amplitudes and phases (to be described later) of the oscillatory motion of the first oscillator 101. Thus, two light receiving elements 140 are provided to enable measurement of the detection time of a number larger than that obtained with the first embodiment.

In this embodiment, the oscillation system 100 is so structured that it can produce first oscillatory motion driven at a fundamental wave which is the fundamental frequency and second oscillatory motion driven by an n-fold wave which is the frequency approximately an integral multiple of the fundamental frequency, at the same time. In other words, the deflection angle θ of the scanning light of the optical deflecting device of the present embodiment is such as follows. When the amplitude, frequency (angular frequency) and phase of the first oscillatory motion are denoted by A, $\omega_1$, and $y_1$, respectively, the amplitude, frequency (angular frequency) and phase of the second oscillatory motion are denoted by B, $\omega_2$ and $y_2$, respectively, and an appropriate time is taken as an origin or reference time, the deflection angle can be expressed by an equation below. Since the oscillatory motion and the deflection angle θ of the scanning light of the first oscillator 101 correspond each other one to one, the oscillatory motion of the first oscillator 101 can be substantially expressed by this equation as well.

$$\theta(t) = A\sin(\omega_1 t + y_1) + B\sin(\omega_2 t + y_2)$$

In order to accomplish the oscillatory motion of the first oscillator 101 such as above, the driving signal of the oscillator device having two natural oscillation modes according to the present embodiment is arranged to drive the oscillation system 100 so that the first oscillator 101 produces oscillation which can be represented by an equation such as above, including a term of two sinusoidal waves. The driving signal may be anyone provided that it can produce such oscillatory motion of the first oscillator 101. For example, it may be a driving signal produced by combining sinusoidal waves of a fundamental wave and an n-fold wave.

Alternatively, a pulsed driving signal may be used. In that case, a target driving signal can be obtained by adjusting the phase and amplitude of each sinusoidal wave. Furthermore, if a pulse signal is used for the driving, a target driving signal can be generated by changing the number of pulses, spacing and width in terms of time. Here, once the driving frequency of the component corresponding to the fundamental wave of the driving signal is fixed, the driving frequency of the component corresponding to the n-fold wave of the driving signal is determined automatically by multiplying the driving frequency of the fundamental wave by n. Inversely, the driving frequency of the component corresponding to the fundamental wave of the driving signal is fixed automatically by multiplying the driving frequency of the n-fold wave by 1/n.

In this specification, the words "approximately integer multiple" refers to a case wherein, when the frequency of the fundamental wave is $f_1$ and the frequency of the n-fold wave is $f_2$, a relation $0.98N \leq f2/f1 \leq 1.02N$ (where N is an integer not less than 2) is satisfied.

In this embodiment, the oscillation amplitude of the first embodiment refers to the oscillation amplitude (A or B in the equation) of the first or second oscillatory motion of the first oscillator 101 being driven at the fundamental wave o-fold wave. Furthermore, the amplitude of the driving signal refers to the amplitude of the component corresponding to the fundamental wave or n-fold wave of the driving signal. Then, from the detection time measured by the time measuring member 152, the oscillation amplitude corresponding to the fundamental wave or n-fold wave is detected, and the driving amplitude of the component corresponding to the fundamental frequency or the n-fold wave of the driving signal is controlled so that the detected amplitude becomes equal to a target value. If the oscillation amplitude and the amplitude of the driving signal of the first embodiment are replaced by these amplitudes, respectively, the explanation having been made with reference to the first embodiment just applies as the explanation of the operation of the present embodiment. If the resonance frequency of the fundamental wave is to be detected, the one concerning the fundamental wave should replace it, and if the resonance frequency of the n-fold wave is to be detected, the one concerning the n-fold wave should replace it. The following description will be made with regard to a case where the resonance frequency of the fundamental wave is to be detected.

In this embodiment, the driving amplitude control unit 154 performs the following control procedure based on the difference between the detection time measured by the time measuring member and the target time 153 set by the controller 151. More specifically, it controls the amplitude A and phases $y_1$ and $y_2$ of the component corresponding to the fundamental wave of the driving signal so that the first oscillatory motion of the oscillation system becomes equal to the target oscillatory motion.

The waveform generator 157 generates waveforms of the frequency set by the driving frequency control unit 156 and of the n-fold wave. Based on the detection time outputted from the time measuring member 152 and the waveform outputted from the waveform generator 157, the driving phase detecting member 155 detects the driving phase $\emptyset_1$ concerning the first oscillatory motion of the oscillator 101 of the oscillation system 100. The driving information recording member 158 records the amplitude of the component corresponding to the fundamental wave of the driving signal controlled by the driving amplitude control unit 154 as well as the driving frequency fd of the component corresponding to the fundamental wave set in the waveform generator 157 by the driving frequency control unit 156, so that the oscillation system obtains the target oscillatory motion.

Based on the amplitude and the driving phase $\emptyset_1$ of the driving signal recorded by the driving information recording member 158, the driving frequency control unit 156 determines the driving frequency of the component corresponding to the fundamental wave and sets the same in the waveform generator 157. Here, once the driving frequency of the component corresponding to the fundamental wave is determined, the driving frequency of the component corresponding to the n-fold wave is fixed. Assuming that the aforementioned replacement is carried out, the operation flow of the driving frequency control unit 156 and the driving information recording member 158 in the present embodiment is essentially the same as that having been described with reference to the first embodiment.

On the other hand, if the driving frequency $fd_0$ of the second oscillatory motion is to be detected when the resonance frequency of the n-fold wave is determined, the driving frequencies fd1, fd2 and fd3 of the n-fold wave are taken as the values to be used for the computation (here, the driving frequencies of the fundamental wave are $1/n*fd_1$, $1/n*fd_2$ and $1/n*fd_3$). Then, the driving frequency $fd_0$ of the n-fold wave can be obtained by using the amplitudes B1, B2 and B3 of the component of the driving signal corresponding to the n-fold which assures the target oscillatory motion. When the driving frequency $fd_0$ with which the amplitude B of the driving signal, corresponding to the resonance frequency of the second oscillatory motion, becomes minimal is to be detected and, if the driving phase comparison is going to be made, the driving phase $\emptyset_2$ concerning the second oscillatory motion of the oscillator 101 of the oscillation system 100 is used.

In the present embodiment as has been described above, the oscillation system is comprised of a plurality of oscillators and a plurality of resilient supporting members. The resonance frequency thereof has a fundamental frequency of a fundamental wave and an n-fold frequency of an approximately n-fold the fundamental frequency of the fundamental wave (n is an integer not less than 2). The driving frequency control unit supplies, to a driving member, a driving signal having components of the driving frequencies of a ratio of 1:n corresponding to the fundamental wave and the n-fold wave, to cause the driving member to drive the oscillation system. The detecting means detects the oscillation amplitudes of the oscillation component corresponding to the fundamental wave or n-fold wave of the oscillator of the oscillation system, and the driving amplitude control unit controls the driving amplitude of the component corresponding to the fundamental wave or n-fold wave of the driving signal. Then, in the state in which the driving amplitude control unit controls the driving amplitude of the component corresponding to the fundamental wave or n-fold wave of the driving signal so that the oscillation amplitude of the oscillation component corresponding to the fundamental wave or n-fold wave of the detected oscillator becomes equal to the target value, the driving frequency control unit operates as follows: that is, based on information including the driving frequencies in the respective driving states being driven by these driving signals of driving frequencies of components corresponding to a plurality of fundamental waves or n-fold waves as well as the controlled driving amplitudes, the driving frequency control unit acquires a resonance frequency of the fundamental wave or the n-fold wave of the oscillation system. This is obtained as a driving frequency with which the driving amplitude of the component corresponding to the fundamental wave or n-fold wave of the driving signal becomes minimal.

Additionally, modifications having been described with reference to the first embodiment are possible in the present embodiment. It should be noted that, if the driving frequency of the first oscillatory motion and the driving frequency of the second oscillatory motion can be treated similarly, the resonance frequencies of both of them can be detected at the same time.

Third Embodiment

Figure 10:
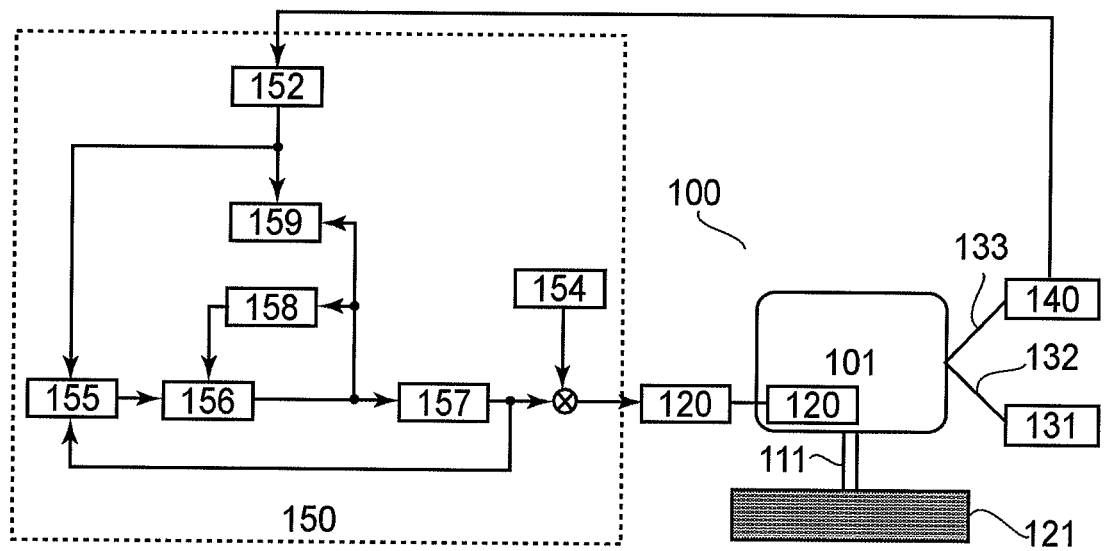
FIG. 10 is a schematic diagram showing an optical deflecting device using an oscillator device according to a third embodiment of the present invention.

FIG. 10 is a schematic diagram of a third embodiment when the present invention is applied to an optical deflecting device.

In this embodiment, the optical deflection unit (optical scanner) is comprised of an oscillation system 100 including one oscillator 101 and a torsion spring 111 which is a resilient supporting member, and a supporting member 121 for supporting the oscillation system 100. A driving member 120 receives a driving signal and, in response, it supplies a driving force to the oscillation system 100 based on an electromagnetic system, an electrostatic system or a piezoelectric system.

The oscillator 101 has an optical deflection element such as a reflecting mirror formed on the surface thereof, for deflective reflecting a light beam 132 from a light source 131 to scan the same. The scanning light 133 passes through a light receiving element 140 which is detecting means twice during a single scan period. A control unit 150 generates a driving signal based on the time when the scanning light 133 passes the light receiving element 140. This driving signal is supplied to a driving member 120.

The deflection angle of the scanning light 133 by the reflecting mirror of the oscillator 101 of the optical deflecting device is essentially the same as that shown in FIG. 2 of the first embodiment.

The structure and operation of the control unit 150 will be explained in detail.

The time measuring member (detecting means) 152 takes an output signal of the light receiving element 140 and measures time t1 and time t2 of the detection time moment of the scanning light 133. The change with respect to time of the deflection angle θ of the scanning light 133 by the optical scanner and time t1 and time t2 concerning the time moment whereat the scanning light 133 passes the set angle θBD of the setting position of the light receiving element 140 are essentially the same as that shown in FIG. 3 of the first embodiment.

A driving amplitude control unit 154 which is detecting means controls the amplitude of a driving signal supplied to the driving member 120, on the basis of the difference Δt1 between the detection time t1 and the target time 153 set by the controller 151 shown in FIG. 3. From the detection time t1 and the frequency set by the driving frequency control unit 156, an oscillation angle calculation member 159 which is detecting means calculates the oscillation amplitude of the oscillator at that frequency. On the other hand, a waveform generator 157 generates a waveform of the driving frequency set by the driving frequency control unit 156.

Furthermore, a driving phase detecting member 155 detects a driving phase ø of the oscillator 101 based on the detection times t1 and t2 outputted from the time measuring member 152 and the waveform outputted from the waveform generator 157.

A driving information recording member 158 records the driving frequency fd set in the waveform generator 157 by the driving frequency control unit 156 and the oscillation amplitude of the oscillator at the driving frequency fd. In this embodiment, on the basis of the oscillation amplitude of the oscillator and the frequency recorded in the driving information recording member 158 as well as the driving phase ø detected by the driving phase detecting member 155, the driving frequency control unit 156 determines the driving frequency fd and sets the same in the waveform generator 157.

Figure 11:
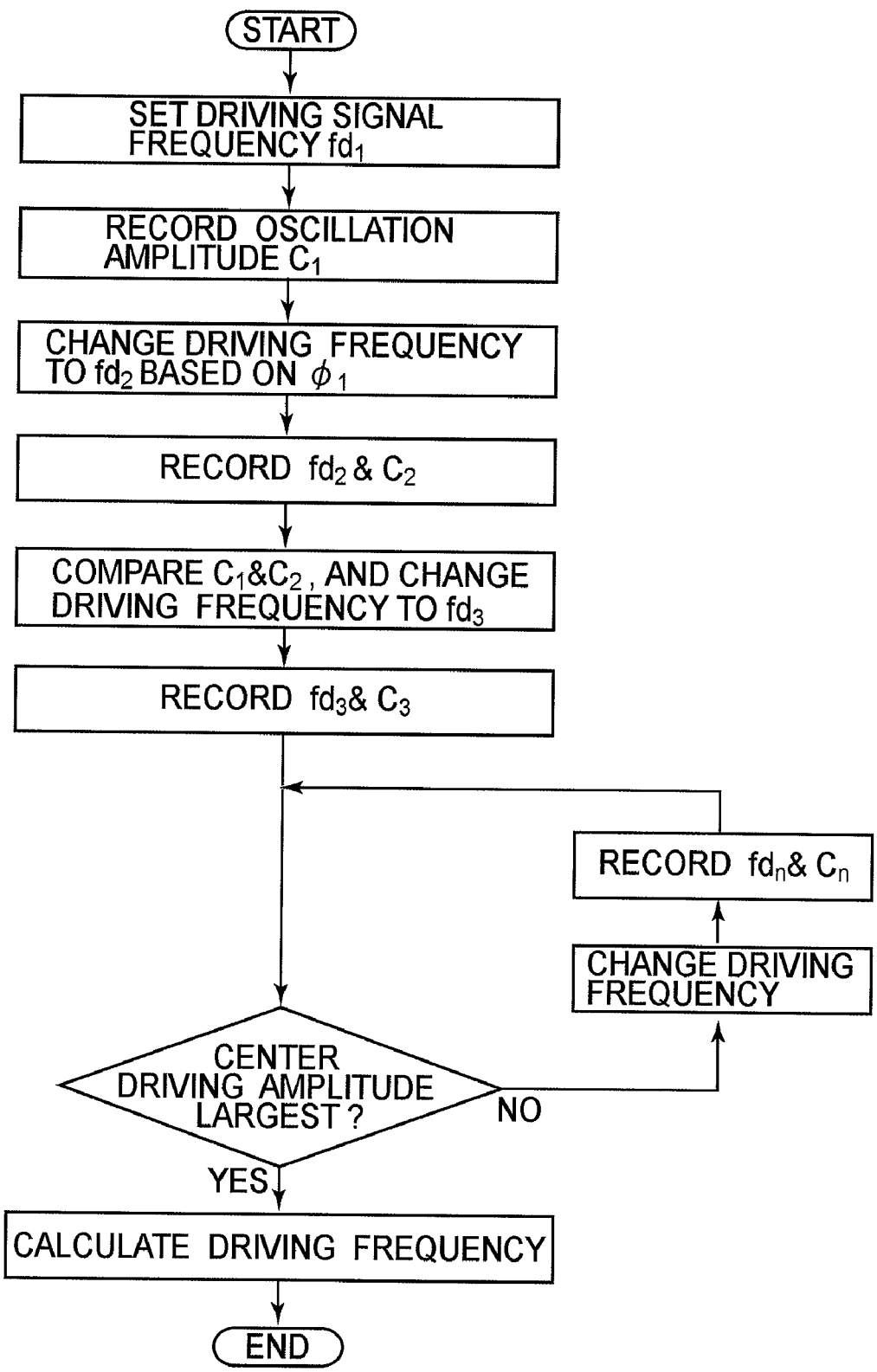
FIG. 11 is a diagram showing the flow of the operation outline of the optical deflecting device of the third embodiment.

FIG. 11 shows an operation flow of the driving frequency control unit 156 and the driving information recording member 158 in the present embodiment. Description will be made to follow the flow. At the time of the driving start, the driving frequency control unit 156 sets, in the waveform generator 157a, a driving frequency fd1 based on the resonance frequency at the time of production and/or a driving frequency at the previous driving, and it starts the driving. An oscillation angle calculating member 159 calculates the oscillation amplitude C1 of oscillator 101 at the driving frequency $fd_1$. The driving information recording member 158 records the driving frequency $fd_1$ and the oscillation amplitude $C_1$ at that time.

A driving frequency $fd_2$ is set as in the first embodiment by driving frequency changing based on the driving phase comparison. The driving information recording member 158 records the oscillation amplitude $C_2$ of the oscillator at the driving frequency $fd_2$ as in the case where the driving frequency is $fd_1$.

Figure 12:
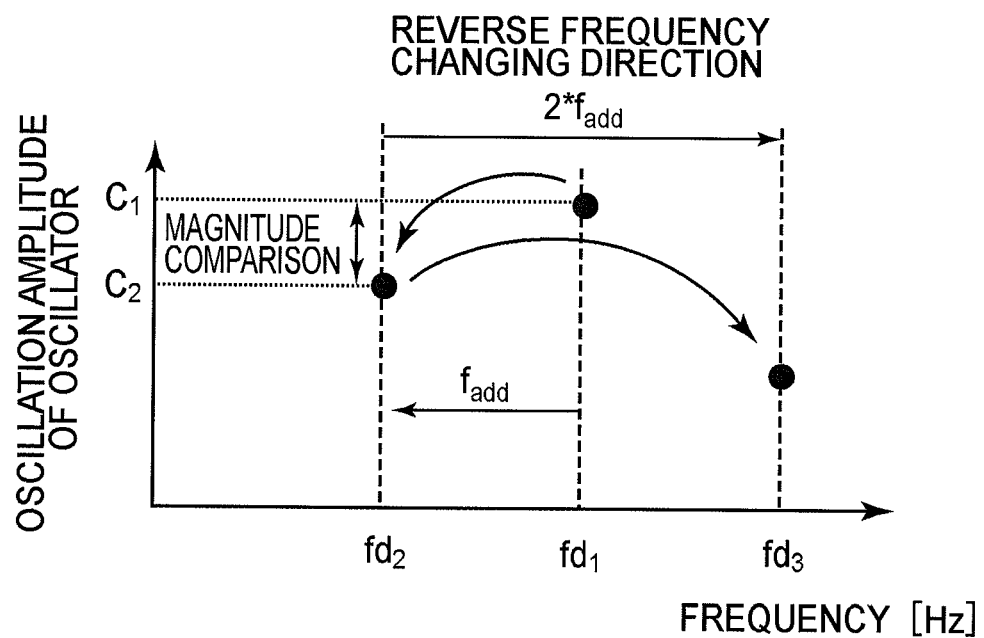
FIG. 12 is a diagram illustrating the changing of the driving frequency of the driving signal based on the comparison of the oscillation amplitude.

FIG. 12 illustrates the driving frequency changing based on the comparison of the oscillation amplitude of the oscillator 101. The driving frequency control unit 156 compares the magnitudes of the oscillation amplitude $C_2$ and the oscillation amplitude $C_1$ recorded in the driving information recording member 158. If as a result of this $C_1$ is smaller than $C_2$, a driving frequency $fd_3$ in which the frequency has been changed by a predetermined frequency changing increment $f_{add}$ in the same direction as the previous frequency change is set in the waveform generator 157. On the contrary, if $C_1$ is larger than $C_2$, as shown in FIG. 12 the driving frequency control unit 156 sets in the waveform generator 157 a driving frequency $fd_3$ in which the frequency has been changed by two-fold the frequency changing increment $f_{add}$ in the direction opposite to the direction of the previous frequency change. Furthermore, the oscillation angle calculating member 159 calculates an oscillation amplitude $C_3$ of the oscillator at the driving frequency $fd_3$ as in the case of the driving frequency $fd_1$. The driving information recording member 158 records the driving frequency $fd_3$ and the oscillation amplitude $C_3$ of the oscillator at that time.

Subsequently, the driving frequency control unit 156 compares, with $C_3$, the oscillation amplitude recorded at the time of the driving frequency close to the driving frequency $fd_3$ being recorded at the time of one driving frequency, among the driving frequencies $fd_1$ and $fd_2$ recorded in the driving information recording member 158, which one driving frequency is close to the driving frequency $fd_3$. If, as a result of this, $C_3$ is smaller, then, based on the driving frequencies and driving amplitudes recorded in the driving information recording member 158 and by using equations (3-1), (3-2) and (3-3) below, quadratic curve interpolation is performed to determine a driving frequency $fd_0$ corresponding to the resonance frequency with which the oscillation amplitude C becomes maximal. Subsequently, the driving frequency control unit 156 sets this driving frequency $fd_0$ in the waveform generator 157.

$$a = \frac{fd_1 \times (C_3 - C_2) - fd_2 \times C_3 + fd_3 \times C_2 + (fd_2 - fd_3) \times C_1}{fd_1 \times (fd_3^2 - fd_2^2) - fd_2 \times fd_3^2 + fd_2^2 \times fd_3 + fd_1^2 \times (fd_2 - fd_3)} \quad (3\text{-}1)$$

$$b = -\frac{fd_1^2 \times (C_3 - C_2) - fd_2^2 \times A_3 + fd_3^2 \times C_2 + (fd_2^2 - fd_3^2) \times C_1}{fd_1 \times (fd_3^2 - fd_2^2) - fd_2 \times fd_3^2 + fd_2^2 \times fd_3 + fd_1^2 \times (fd_2 - fd_3)} \quad (3\text{-}2)$$

$$fd_0 = -\frac{b}{2a} \quad (3\text{-}3)$$

Figure 13:
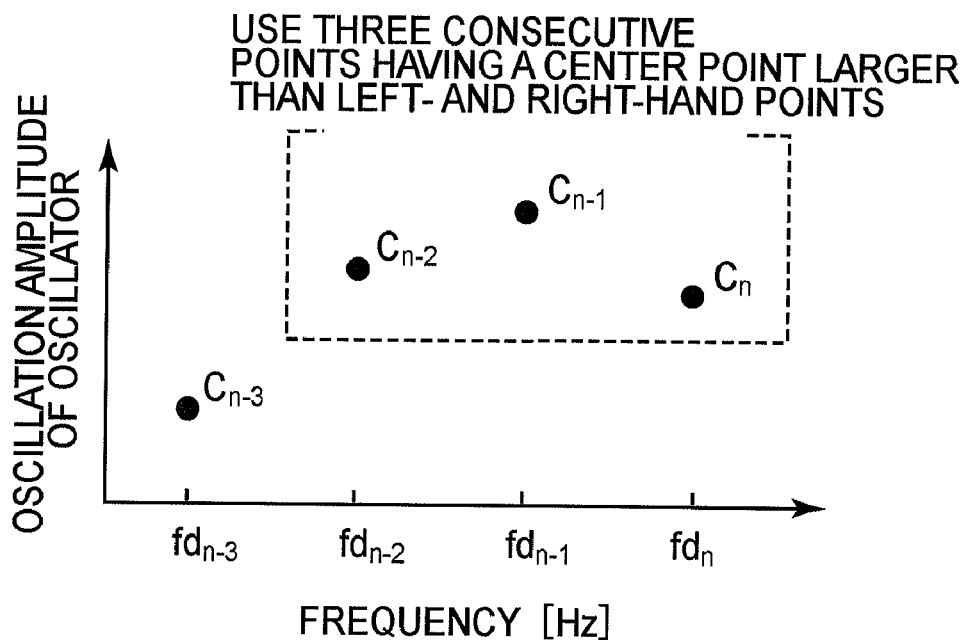
FIG. 13 is a diagram showing three driving frequencies to be used for quadratic-curve interpolation, in the third embodiment.

If on the contrary $C_3$ is larger, the driving frequency changing is carried out so that, as shown in FIG. 13, the oscillation amplitude of the central frequency, among three consecutive ones, becomes larger than the other two oscillation amplitudes. The oscillation amplitude is then recorded in the driving information recording member 158. More specifically, a driving frequency $fd_n$ in which the frequency has been changed by $f_{add}$ in the same direction as the previous driving frequency change is set in the waveform generator 157. Then, the driving frequency control unit 156 repeats the operation until the oscillation amplitude $C_{n-1}$ becomes larger than the oscillation amplitude $C_n$. After that, based on the driving frequencies $fd_n$, $fd_{n-1}$ $fd_{n-2}$ and driving signal amplitudes $C_n$, $C_{n-1}$ and $C_{n-2}$ recorded in the driving information recording member 158, the quadratic curve interpolation is performed using equations similar to equations (3-1), (3-2) and (3-3). In this manner, the driving frequency $fd_0$ with which the oscillation amplitude of the oscillator becomes maximal is obtained.

In the present embodiment as well, if the oscillation amplitude of the central driving frequency, among three consecutive driving frequencies, is not larger than the other oscillation amplitudes, the driving frequency is changed furthermore and the oscillation amplitude is measured again. However, this process may not always be performed.

Furthermore, although in this embodiment driving signal amplitudes of three driving frequencies are used, the number is not limited to three. By using driving signal amplitudes of a plurality (a number n) of driving frequencies, "n−1"th curve interpolation may be performed. Alternatively, by using table or any other function, a driving frequency with which the oscillation amplitude C becomes maximal may be determined.

Furthermore, if the Q-value which is the parameter of the resonance characteristic of the oscillation system less fluctuates by the environment, the value "a" obtainable with equation (3-1) may be a fixed value. From the fixed value "a", driving frequencies $fd_1$ and $fd_2$ and driving signal amplitudes $C_1$ and $C_2$, quadratic curve interpolation may be performed using equation (3-4) below and equation (3-3) mentioned above, the driving frequency $fd_0$ corresponding to the resonance frequency with which the oscillation amplitude C becomes maximal may be determined.

$$b = \frac{-C_2 + C_1 + a \times fd_2^2 - a \times fd_1^2}{fd_1 - fd_2} \quad (3\text{-}4)$$

Furthermore, the driving frequency change increment $f_{add}$ may be determined arbitrarily based on the precision for determination of the driving frequency $f_0$ and the variable range of the resonance frequency. Although in this embodiment the driving frequency changing increment $f_{add}$ has a constant value, $f_{add}$ may be changed at every frequency change.

Although in this embodiment the driving phase is used to determine the driving frequency $fd_2$, the driving frequency $fd_2$ may be determined without the use of judgment based on the driving phase. With regard to the recording of the oscillation amplitude, there may be a stand-by time after the driving frequency is changed and before the oscillator oscillates at that frequency. Furthermore, the driving information recording member may record an average of the oscillation amplitudes during a predetermined time after the change.

In the present embodiment as has been described hereinbefore, in the state in which the driving amplitude control unit controls and maintains constant the driving amplitude of the driving signal, a driving frequency control unit operates as follows. That is, on the basis of the information including the driving frequencies in respective driving states being driven by these driving signals of a plurality of driving frequencies as well as the oscillation amplitude of the oscillator detected by the detecting means, the driving frequency control unit acquires, as the resonance frequency of the oscillation system, a driving frequency of a driving signal with which the oscillation amplitude of the oscillator becomes maximal.

The technique of the present embodiment as well can be applied also to a device according to the second embodiment. More specifically, in such case, the oscillation system comprises a plurality of oscillators and a plurality of resilient supporting members. The resonance frequency thereof has a fundamental frequency of a fundamental wave and an n-fold frequency of an n-fold wave approximately n-fold the fundamental frequency of the fundamental wave (n is an integer not less than 2). The driving frequency control unit supplies, to the driving member, a driving signal having components of driving frequencies of a ratio of 1:n corresponding respectively to the fundamental wave and the n-fold wave, to cause the driving member to drive the oscillation system. The detecting means detects the oscillation amplitude of the oscillation component corresponding to the fundamental wave or n-fold wave of the oscillator of the oscillation system. The driving amplitude control unit controls the driving amplitude of the component corresponding to the fundamental wave or n-fold wave of the driving signal. Then, in the state in which the driving amplitude control unit controls and maintain constant the driving amplitude of the component corresponding to the fundamental wave or n-fold wave of the driving signal, the driving frequency control unit performs the following operation. That is, on the basis of the information including the driving frequencies in respective driving states being driven by these driving signals of driving frequencies of components corresponding to a plurality of fundamental waves or n-fold waves as well the oscillation amplitude corresponding to the fundamental wave or n-fold wave of the oscillator detected by the detecting means, the driving frequency control unit acquires a resonance frequency of the fundamental wave of or n-fold wave of the oscillation system. This is obtained as the driving frequency of the component corresponding to the fundamental wave or n-fold wave of the driving signal with which the oscillation amplitude of the oscillation component corresponding to the fundamental wave or n-fold wave of the oscillator becomes maximal.

In the present embodiment as well, by suitably performing the setting of the initial driving frequency and the setting of the frequency changing increment, a frequency which can be regarded as the resonance frequency of the oscillation system of the oscillator device can be determined in short time based on a fewer number of driving frequency change. By adjusting the increment of the driving frequency change, a frequency which can be regarded as the resonance frequency can be determined at high precision.

Fourth Embodiment

Figure 14:
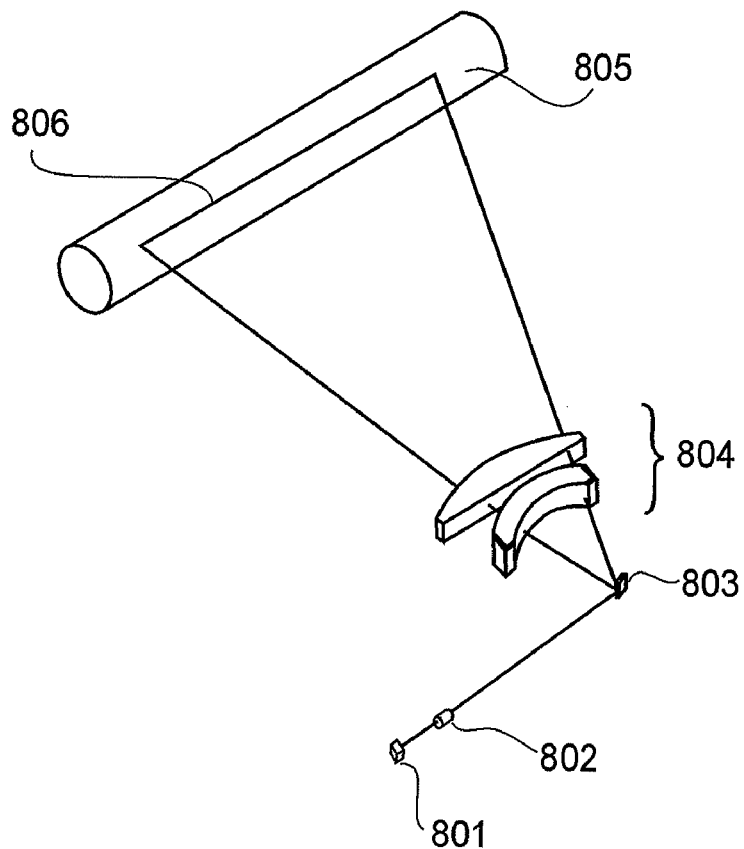
FIG. 14 is a perspective view illustrating an embodiment of an image forming apparatus using an optical deflecting device according to the present invention.

FIG. 14 is a diagram showing an embodiment of an optical instrument using an optical deflecting device according to any one of the preceding embodiments. Here, an image forming apparatus is illustrates as the optical instrument.

In FIG. 14, denoted at 803 is an optical deflecting device according to the present invention. In this embodiment, incident light is scanned one-dimensionally. Denoted at 801 is a laser source, and denoted at 802 is a lens or lens group. Denoted at 804 is a writing lens or lens group, and denoted at 805 is a photosensitive member. Denoted at 806 is the locus of scan.

A laser beam emitted from a laser source 801 undergoes predetermined intensity modulation related the timing of the scanning deflection of the light, and it is scanned by the optical deflecting device 803 one-dimensionally. By means of the writing lens 804, the scanned laser beam is imaged to form an image on the photosensitive member 805. The photosensitive member 805 is electrically charged uniformly by a charging device (not shown). By scanning it with the light beam, an electrostatic latent image is formed in the scanned portion. Then, a toner image is formed at the electrostatic image portion by means of a developing device (not shown). The toner image is then transferred and fixed on a transfer sheet (not shown), whereby an image is formed on the paper sheet. Since the image forming apparatus uses an optical deflecting device of the present invention which can be driven at a frequency that can be detected quickly and regarded as the resonance frequency at high precision, this embodiment provides a high-performance image forming apparatus in which the driving can be started quickly.

An optical deflecting device of the present invention can be used in any other optical instruments to deflect a light beam from a light source so that at least a portion of the light is incident on an object to be irradiated by light. Example of such optical instruments are, in addition to the image forming apparatus such as a laser beam printer, an optical instrument for scanning a light beam such as a visual display unit and a bar code reader or the like.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2008-040752 filed Feb. 22, 2008, for which is hereby incorporated by reference.

What is claimed is:

1. An oscillator device, comprising:
   an oscillation system including an oscillator and a resilient supporting member;
   a driving member configured to supply a driving force to said oscillation system based on a driving signal;
   a detecting member configured to detect at least an oscillation amplitude of said oscillator;
   a driving amplitude control unit configured to control at least a driving amplitude of the driving signal; and
   a driving frequency control unit configured to control a driving frequency of the driving signal to be supplied to said driving member;
   wherein, in a state in which said driving amplitude control unit controls the driving amplitude of a driving signal so that the oscillation amplitude to be detected becomes equal to a target value, and on the basis of information including driving frequencies in different driving states being driven with driving signals of these driving frequencies as well as the controlled driving amplitude, said driving frequency control unit acquires, as a resonance frequency of said oscillation system, a driving frequency with which the driving amplitude of the driving signal becomes minimal.

2. An oscillator device according to claim 1, wherein said driving frequency control unit supplies a driving signal of the driving frequency acquired as the resonance frequency of said oscillation system to said driving member to causes said driving member to drive said oscillator device so that the oscillation amplitude to be detected becomes equal to a target value.

3. An oscillator device according to claim 1, further comprising a driving information recording member configured to record a driving frequency and a driving amplitude of a driving signal, wherein, in each of different driving states being driven with respective driving signals of a plurality of driving frequencies, said driving information recording member records a driving frequency and a driving amplitude of the driving signal with which said oscillator obtains a target oscillation amplitude, and wherein, on the basis of information related to the driving frequencies and driving amplitudes of the recorded driving signals, said driving frequency control unit acquires, as the resonance frequency of said oscillation system, a driving frequency with which the driving amplitude of the driving signal becomes minimal.

4. An oscillator device according to claim 3, wherein, on the basis of the driving frequencies and the driving amplitudes of the driving signals in the driving states based on driving signals of driving frequencies of a number n (n is an integer not less than 3) as recorded by said driving information recording member, said driving frequency control unit performs "n−1"th order curve interpolation to acquire, as the resonance frequency of said oscillation system, a driving frequency with which the driving amplitude of the driving signal becomes minimal.

5. An oscillator device according to claim 3, wherein, on the basis of the driving frequencies and driving amplitudes of the driving signals in the corresponding driving states based on driving signals of at least two driving frequencies as recorded by said driving information recording member as well as a characteristic parameter of said oscillation system measured beforehand, said driving frequency control unit acquires, as the resonance frequency of said oscillation system, a driving frequency with which the driving amplitude of the driving signal becomes minimal.

6. An oscillator device according to claim 1, wherein said driving frequency control unit determines a driving frequency of a driving signal to be used subsequently, based on the driving frequency and the driving amplitude recorded in the driving information recording member.

7. An oscillator device according to claim 6, wherein said driving frequency control unit determines a driving frequency of a driving signal to be used subsequently, so that the driving amplitude of a driving signal having a central driving frequency among three consecutive driving frequencies becomes smaller than the driving amplitudes of the driving signals of the other driving frequencies.

8. An oscillator device according to claim 7, wherein, when the driving frequency of the driving signal is to be changed, said driving frequency control unit determines a driving frequency of a driving signal to be used subsequently, on the basis of magnitude comparison between the driving amplitude of a driving signal of a current driving frequency and the driving amplitude of a driving signal of a previous driving frequency.

9. An oscillator device according to claim 8, wherein said driving frequency control unit determines the driving frequency of a driving signal to be used subsequently, based on a driving phase of said oscillator relative to the phase of a driving signal of a current driving frequency.

10. An oscillator device according to claim 1, wherein said oscillation system includes a plurality of oscillators and a plurality of resilient supporting members, wherein a resonance frequency thereof has a fundamental frequency of fundamental wave and an n-fold frequency of an n-fold wave which is approximately n-fold the fundamental frequency (n is an integer not less than 2), wherein said driving frequency control unit supplies, to said driving member, driving signals having components of driving frequencies of a ratio of 1:n corresponding to the fundamental wave and the n-fold wave, respectively, to cause said driving member to drive said oscillation system, wherein said detecting member detects the oscillation amplitude of the oscillation component corresponding to the fundamental wave or n-fold wave of said oscillator of said oscillation system, wherein said driving amplitude control unit controls the driving amplitude of a component corresponding to the fundamental wave or n-fold wave of the driving signal, wherein, in the state in which said driving amplitude control unit controls the driving amplitude of a component corresponding to the fundamental wave or the n-fold wave of the driving signal so that the detected oscillation amplitude of the oscillation component corresponding to the fundamental wave or n-fold wave of said oscillator becomes equal to a target value, and on the basis of information including driving frequencies of components corresponding to a plurality of fundamental waves or n-fold waves in respective driving states being driven by driving signals of these driving frequencies as well as the controlled driving amplitude, said driving frequency control unit acquires, as a resonance frequency of the fundamental wave or n-fold wave of said oscillation system, a driving frequency with which the driving amplitude of the component corresponding to the fundamental wave or n-fold wave of the driving signal becomes minimal.

11. An optical deflecting device, comprising:
an oscillator device as recited in claim 1; and
an optical deflection element disposed on at least one said oscillator to deflect a light beam incident on said optical deflection element.

12. An optical instrument including an optical deflecting device as recited in claim 11, wherein said optical deflecting device is configured to deflect a light beam from a light source so that at least a portion of the light beam is incident on an object to be irradiated by light.

13. An oscillator device, comprising:
an oscillation system including an oscillator and a resilient supporting member;
a driving member configured to supply a driving force to said oscillation system based on a driving signal;
a detecting member configured to detect at least an oscillation amplitude of said oscillator;
a driving amplitude control unit configured to control at least a driving amplitude of the driving signal; and
a driving frequency control unit configured to control a driving frequency of the driving signal to be supplied to said driving member;
wherein, in a state in which said driving amplitude control unit controls and maintains the driving amplitude of the driving signal constant, and on the basis of information including driving frequencies in different driving states being driven with driving signals of these driving frequencies as well as the oscillation amplitude of said oscillator detected by said detecting member, said driving frequency control unit acquires, as the resonance frequency of said oscillation system, a driving frequency of a driving signal with which the oscillation amplitude of said oscillator becomes maximal.

14. An oscillator device according to claim 13, wherein said oscillation system includes a plurality of oscillators and a plurality of resilient supporting members, wherein a resonance frequency thereof has a fundamental frequency of fundamental wave and an n-fold frequency of an n-fold wave which is approximately n-fold the fundamental frequency (n is an integer not less than 2), wherein said driving frequency control unit supplies, to said driving member, driving signals having components of driving frequencies of a ratio of 1:n corresponding to the fundamental wave and the n-fold wave, respectively, to cause said driving member to drive said oscillation system, wherein said detecting member detects the oscillation amplitude of an oscillation component corresponding to the fundamental wave or n-fold wave of said oscillator of said oscillation system, wherein said driving amplitude control unit controls the driving amplitude of a component corresponding to the fundamental wave or n-fold wave of the driving signal, wherein, in the state in which said driving amplitude control unit controls and maintains constant the driving amplitude of a component corresponding to the fundamental wave or the n-fold wave of the driving signal, and on the basis of information including driving frequencies of components corresponding to a plurality of fundamental waves or n-fold waves in respective driving states being driven by these driving frequencies as well as the driving amplitude corresponding to the fundamental wave or n-fold wave of said oscillator as detected by said detecting member, said driving frequency control unit acquires, as a resonance frequency of the fundamental wave or n-fold wave of said oscillation system, a driving frequency of a component corresponding to the fundamental wave or n-fold wave of the driving signal with which the oscillation amplitude of the oscillation component corresponding to the fundamental wave or n-fold wave of said oscillator becomes maximal.

15. A method of detecting a resonance frequency of an oscillation system of an oscillator device including the oscillation system having an oscillator and a resilient supporting member, and a driving member configured to supply a driving force to the oscillation system based on a driving signal, characterized in that:

in a state in which a driving amplitude of a driving signal is controlled so that an oscillation amplitude of the oscillator driven by the driving member becomes equal to a target value, the oscillator is driven by driving signals of a plurality of driving frequencies sequentially; and on the basis of information including the plurality of driving frequencies in respective driving states being driven with driving signals of these driving frequencies as well as the controlled driving amplitude, a driving frequency with which the driving amplitude of the driving signal becomes minimal is acquired as the resonance frequency of the oscillation system.

16. A method of detecting a resonance frequency of an oscillation system of an oscillator device including the oscillation system having an oscillator and a resilient supporting member, and a driving member configured to supply a driving force to the oscillation system based on a driving signal, characterized in that:

in a state in which a driving amplitude of a driving signal is controlled and maintained constant, the oscillator is driven by driving signals of a plurality of driving frequencies sequentially and an oscillation amplitude of the oscillator is detected; and on the basis of information including the plurality of driving frequencies in respective driving states being driven with driving signals of these driving frequencies as well as the detected oscillation amplitude of the oscillator, a driving frequency with which the oscillation amplitude of the oscillator becomes maximal is acquired as the resonance frequency of the oscillation system.

* * * * *